(12) United States Patent
Katuri et al.

(10) Patent No.: US 9,395,436 B2
(45) Date of Patent: Jul. 19, 2016

(54) COOPERATIVE INTRUSION DETECTION

(71) Applicant: Honeywell International Inc., Morristown, NJ (US)

(72) Inventors: SrinivasaRao Katuri, Bangalore (IN); Steve Huseth, Plymouth, MN (US); Amit Kulkarni, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 414 days.

(21) Appl. No.: 13/914,370

(22) Filed: Jun. 10, 2013

(65) Prior Publication Data

US 2014/0361920 A1    Dec. 11, 2014

(51) Int. Cl.
| | |
|---|---|
| *G01S 13/04* | (2006.01) |
| *G01S 13/56* | (2006.01) |
| *G01S 7/00* | (2006.01) |
| *G08B 25/10* | (2006.01) |
| *G01S 13/87* | (2006.01) |
| *G01S 13/32* | (2006.01) |
| *G01S 13/66* | (2006.01) |
| *G08B 13/16* | (2006.01) |
| *G08B 29/18* | (2006.01) |

(52) U.S. Cl.
CPC ............... *G01S 13/04* (2013.01); *G01S 7/003* (2013.01); *G01S 13/325* (2013.01); *G01S 13/87* (2013.01); *G01S 13/66* (2013.01); *G08B 13/1609* (2013.01); *G08B 25/10* (2013.01); *G08B 29/181* (2013.01); *G08B 29/188* (2013.01)

(58) Field of Classification Search
CPC ..... G01S 7/003; G01S 7/2922; G01S 7/2927; G01S 7/41–7/412; G01S 7/415; G01S 13/04; G01S 13/56; G08G 1/01; G08G 1/017; G08G 1/065; G08B 25/10; G08B 25/009; G08B 13/00; G08B 13/22; G08B 13/2491; G08B 25/08; H04W 84/18
USPC .......... 342/27, 28; 340/539.22, 540, 541, 552
See application file for complete search history.

(56) References Cited

U.S. PATENT DOCUMENTS

| | | | | |
|---|---|---|---|---|
| 4,882,567 | A | * | 11/1989 | Johnson ........................ 340/522 |
| 5,107,249 | A | * | 4/1992 | Johnson ........................ 340/541 |
| 5,576,972 | A | * | 11/1996 | Harrison ....................... 702/128 |
| 5,578,988 | A | * | 11/1996 | Hoseit et al. .................. 340/522 |
| 6,614,384 | B2 | * | 9/2003 | Hall et al. ...................... 342/28 |

(Continued)

OTHER PUBLICATIONS

Koji Yamamoto et al: "Barrier Coverage Constructions for Border Security Systems Using Wireless Sensors", Parallel Processing Workshops (ICPPW), 2811 48th International Conference on, IEEE, Sep. 13, 2011 (2011-89-13), pp. 50-56.*
Sun, et al., "BorderSense: Border Patrol Through Advanced Wireless Sensor Networks", Ad Hoc Networks 9 (2011) 468-477 (10 pages).

(Continued)

*Primary Examiner* — Peter Bythrow
(74) *Attorney, Agent, or Firm* — Brooks, Cameron & Huebsch, PLLC

(57) ABSTRACT

Systems, methods, and devices for cooperative intrusion detection are described herein. For example, one or more embodiments include completing a radar scan with a network of outer perimeter radar nodes, detecting an intrusion event with the network of outer perimeter radar nodes, notifying at least one inner perimeter radar node in a network of inner perimeter radar nodes of the intrusion event, activating the at least one inner perimeter radar node from an idle mode in response to the notification of the intrusion event, and completing a radar scan with the at least one inner perimeter radar node upon activation.

19 Claims, 6 Drawing Sheets

(56) References Cited

U.S. PATENT DOCUMENTS

| | | | |
|---|---|---|---|
| 7,154,392 B2* | 12/2006 | Rastegar et al. | 340/552 |
| 7,295,109 B2* | 11/2007 | Kobayashi | 340/541 |
| 7,688,202 B1* | 3/2010 | Doyle et al. | 340/541 |
| 7,760,109 B2* | 7/2010 | Broad et al. | 340/539.23 |
| 8,111,156 B2* | 2/2012 | Song et al. | 340/541 |
| 8,456,304 B2* | 6/2013 | van Doorn et al. | 340/541 |
| 8,710,983 B2* | 4/2014 | Malkowski | 340/539.22 |
| 8,730,088 B2* | 5/2014 | Milligan et al. | 342/57 |
| 2006/0132301 A1* | 6/2006 | Stilp | 340/539.22 |
| 2007/0195759 A1* | 8/2007 | Chowdhury et al. | 370/389 |
| 2008/0018464 A1* | 1/2008 | van Doorn et al. | 340/553 |
| 2008/0036589 A1* | 2/2008 | Werb et al. | 340/539.22 |
| 2008/0143529 A1* | 6/2008 | Gauvreau | 340/567 |
| 2010/0045457 A1* | 2/2010 | Krill | 340/539.22 |
| 2010/0156637 A1* | 6/2010 | Samuelson | 340/541 |
| 2010/0283662 A1 | 11/2010 | Fox et al. | |
| 2011/0063110 A1* | 3/2011 | Habib et al. | 340/552 |
| 2011/0063111 A1* | 3/2011 | Habib et al. | 340/552 |
| 2012/0032833 A1* | 2/2012 | Milligan et al. | 342/59 |
| 2012/0032834 A1 | 2/2012 | Weeks | |
| 2012/0206289 A1* | 8/2012 | Allam | 342/107 |
| 2013/0335219 A1* | 12/2013 | Malkowski | 340/539.22 |

OTHER PUBLICATIONS

Scharrenbroich, et al., "Cooperative Networked Radar: The Two-Step Detector", Asilomar Conference on Signals, Systems and Computers, Nov. 9, 2011, QinetiQ North America—Technology Solutions Group, (28 pages).

"Cooperative Discrimination Sensor: Detecting and Tracking Human Activity", FY05 Engineering Research and Technology Report, accessed Jun. 10, 2013 (2 pages).

Li, et al., "Multi-user Data Sharing in Radar Sensor Networks", Department of Computer Science, University of Massachusetts, Amherst MA 01003, accessed Jun. 10, 2013 (14 pages).

Dutta, et al., "Towards Radar-Enabled Sensor Networks", IPSN '06, Apr. 19-21, 2006, Nashville, Tennessee (8 pages).

Takuya Suzuki, et al. "Wave-type barrier coverage for border security in Wireless Sensor Networks." Computing and Convergence Technology (ICCCT), 2012 7th International Conference on IEEE. Dec. 3, 2012. pp. 78-83.

Koji Yamamoto, et al. "Barrier Coverage Constructions for Border Security Systems Using Wireless Sensors." Parallel Processing Workshops (ICPPW). 2011 40th International Conference on IEEE. Sep. 13, 2011, pp. 50-56.

EP Search Report related to EP Application 14169370.5 dated Oct. 29, 2014 (6 pages).

* cited by examiner

COOPERATIVE INTRUSION DETECTION

TECHNICAL FIELD

The present disclosure relates to cooperative intrusion detection.

BACKGROUND

Areas can be maintained to provide for security and/or safety of the area (e.g., airports, businesses). For example, a fence, a surveillance system, and/or motion detectors can be installed. While a fence can help with preventing physical entry into the area, activities within the area can still be monitored by an individual from a vantage point outside the fence.

A surveillance system that utilizes a camera can be used to monitor a perimeter of the area. However, a field of view of the camera can be small compared to a size of the area and/or perimeter and an individual trying to gain unauthorized access to the area can be concealed by a non-line of sight condition (e.g., foliage, debris), for example.

Alternatively, and/or in addition, a motion detector can be used to detect an individual trying to gain access to the area. However, the individual can be concealed by a non-line of site condition, which can prevent the motion detector from detecting the individual.

DETAILED DESCRIPTION

Figure 1A:
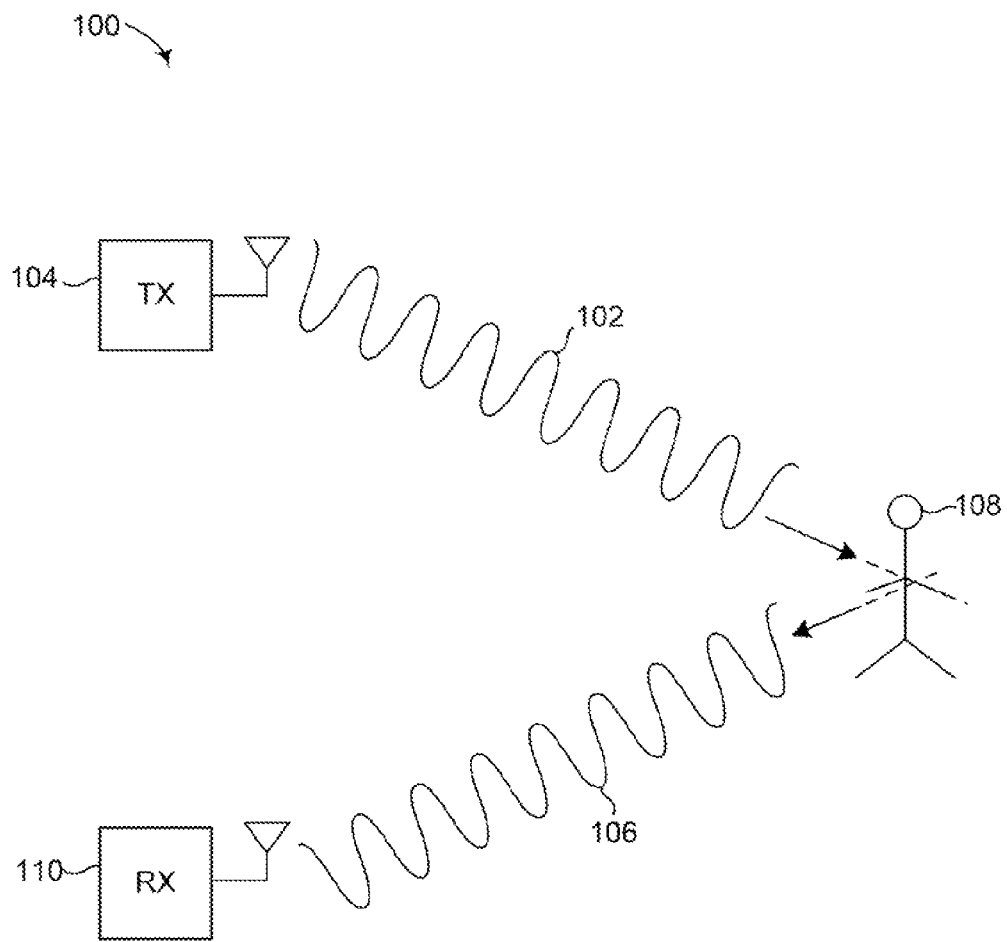
FIGS. 1A-B illustrate a system for cooperative intrusion detection according to one or more embodiments of the present disclosure.

Systems, methods, and devices for cooperative intrusion detection are described herein. For example, one or more embodiments include completing a radar scan with a network of outer perimeter radar nodes, detecting an intrusion event with the network of outer perimeter radar nodes, notifying at least one inner perimeter radar node in a network of inner perimeter radar nodes of the intrusion event, activating the at least one inner perimeter radar node from an idle mode in response to the notification of the intrusion event, and completing a radar scan with the at least one inner perimeter radar node upon activation.

Security and/or safety of a particular area can be maintained through use of a variety of technologies. Infra-red and/or ultrasonic sensor technologies can be used to maintain the security and/or safety of an area. However, these technologies can require a line of sight between a sensor and an intrusion event for an accurate detection of the intrusion event. For example, if an obstruction, such as foliage and/or debris is located between the sensor and the intrusion event, the foliage and/or debris can obstruct the line of sight between the sensor and intrusion event, which can prevent an accurate detection of the intrusion event.

Alternatively, and/or in addition, video surveillance technologies can be used to maintain the security and/or safety of an area. However, video surveillance technologies can also require a line of sight between the camera and the intrusion event for an accurate detection of the intrusion event.

Alternatively, and/or in addition, remote areas (e.g., regional boarders) can have foliage, debris, hilly terrain, rocky terrain, and/or snowy terrain that can affect a line of site between sensors used to monitor the area and/or increase a difficulty of maintaining the sensors because the sensors are in a remote area, which may not have electricity and can have hostile terrain, which may not be easily traversed. In an example, it may be difficult to run power to the sensors. Batteries can be used to provide power for the sensors, however, changing the batteries may be difficult as a result of having to traverse across the remote and/or hostile terrain.

Acoustic and/or seismic sensors can be used to maintain security and/or safety of an area, however a range of the sensors can be limited (e.g., within 10 meters of the sensor). Alternatively, and/or in addition, acoustic and/or seismic sensors can generate false alarms due to noises associated with blowing winds and can be difficult to deploy in rocky terrain. In an example, the acoustic and/or seismic sensors may not have a way to assign an intrusion event bearing relative to the sensor.

Alternatively, and/or in addition, fiber optic cables can be used to detect an intrusion event. However, frost heaves, rocky terrain, and/or accumulated snow and/or ice on the ground can make deployment, maintenance, and/or detection of an intrusion event difficult.

Some embodiments of the present disclosure can provide for a cooperative intrusion detection system that can operate in a non-line of sight condition. For example, some embodiments can use a transmitter that transmits a DSSS signal of a particular frequency, which can penetrate foliage and/or debris that can obstruct a line of sight between the sensor and the intrusion event, enabling detection of the intrusion event.

Alternatively, and/or in addition, some embodiments can provide for an outward looking capability for detecting an intrusion event. For example, some embodiments can detect an intrusion event, which is located in a position other than in between a transmitter and receiver 510. As such, an intrusion event can be detected in advance of crossing between the transmitter and receiver 510, providing additional time to alert security personal.

Alternatively, and/or in addition, some embodiments can use a multi-antenna receiver that can be used to receive the reflection of the transmitted DSSS signal off of the intrusion event. In an example, the reflected DSSS signal can be scattered as a result of reflecting off of foliage and/or debris. Use of the multi-antenna receiver can allow for an accurate determination of a position of the intrusion event.

Some embodiments of the present disclosure can determine a position of the intrusion event based on a phase delay between a DSSS signal that is transmitted and a reflected DSSS signal that is received from the intrusion event. In an example, a time delay between the transmitted DSSS signal and the reflected DSSS signal that is received can be calculated and used in determination of the position of the intrusion event.

Some embodiments of the present disclosure can determine a speed of the intrusion event based on the phase delay between the DSSS signal that is transmitted and a reflected DSSS signal that is received. Alternatively, and/or in addition a direction that the intrusion event is traveling can be determined.

Some embodiments of the present disclosure can include determining a size of the intrusion event based on an amplitude signature of the reflected DSSS signal and a radial extent of the intrusion event. In an example, the size of the intrusion event and the speed of the intrusion event can be used to classify a type of the intrusion event.

Some embodiments can include a network of radar nodes that can detect an intrusion event and can communicate with one another to track the intrusion event. In an example, some of the radar nodes can operate in an idle mode to conserve energy, allowing the radar nodes to remain operational for a longer period of time without service.

Some embodiments can include determining whether an intrusion event is a false alarm. For example, the network of radar nodes can distinguish between a false alarm that includes a tree blowing in the wind or an animal detected by a radar node and an actual alarm that includes a vehicle and/or a human detected by the radar node.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1A, and a similar element may be referenced as 510 in FIG. 5.

As will be appreciated, elements shown in the various embodiments herein can be added, exchanged, and/or eliminated so as to provide a number of additional embodiments of the present disclosure. As used herein, "a number of" refers to one or more. In addition, as will be appreciated, the proportion and the relative scale of the elements provided in the figures are intended to illustrate the embodiments of the present invention, and should not be taken in a limiting sense.

Figure 1B:
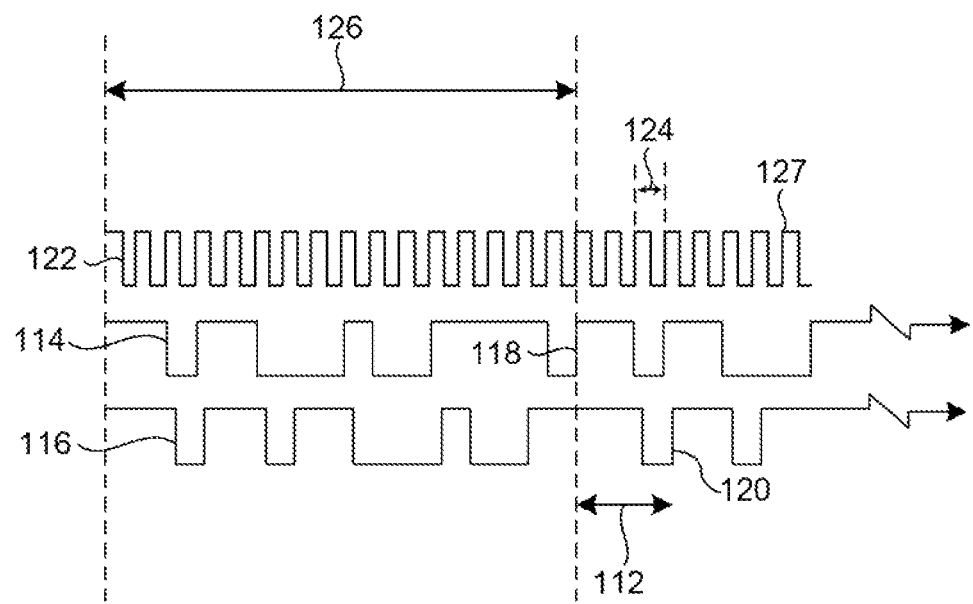

FIGS. 1A-B illustrate a system for cooperative intrusion detection according to one or more embodiments of the present disclosure. As shown in FIG. 1A, a DSSS signal 102 can be transmitted. In some embodiments, the transmitted DSSS signal 102 can be a pseudo-noise code-modulated signal. The pseudo-noise code-modulated signal can be modulated in frequency according to a code. In an example, the code can be binary (e.g., consisting of 1's and 0's).

The DSSS signal 102 can be transmitted by a transmitter 104, in an example. As used herein, the DSSS signal 102 can be defined as a radio frequency communications signal in which the signal bandwidth is spread over a larger bandwidth by injecting a higher frequency signal. The DSSS signal 102 can be transmitted at a frequency in the Industrial, Scientific, and Medical (ISM) bands. These bands can allow for unlicensed electromagnetic radiation across a number of wide spectrum bands. In an example, the DSSS signal 102 can be transmitted at a frequency of at least one of 900 megahertz, 2.4 gigahertz, and/or 5.8 gigahertz.

The DSSS signal 102 can reflect off of an intrusion event 108 to form a reflected DSSS signal 106. In an example, the intrusion event can be an individual, animal, and/or vehicle, for example. The intrusion event can be concealed by vegetation and/or debris, such that a non-line of sight condition exists.

Upon reflection of the DSSS signal 102, the reflected DSSS signal 106 can undergo a phase delay versus the DSSS signal 102. For example, the phase of the reflected DSSS signal 106 can be delayed by a particular time as a result of the reflection of the DSSS signal off of the intrusion event 108.

In some embodiments, the reflected DSSS signal 106 can be received from the intrusion event 108. In an example, the reflected DSSS signal 106 can be received by a receiver 110.

The transmitter 104 and the receiver 110 can be located at the same point and/or can be located at different points. When the transmitter 104 and the receiver 110 are located at the same point, the DSSS signal can be transmitted and received at the same point. When the transmitter 104 and the receiver 110 are at different points, the DSSS signal can be transmitted at a first point and received at a second point. As defined herein, the transmitter 104 and the receiver 110 pair can be referred to as a radar node.

In some embodiments, the DSSS signal can be transmitted by the transmitter 104 in a direction away from the receiver 110, as shown in FIG. 1A. As such, the system 100 differs from a radio frequency curtain. In an example, a radio frequency curtain can be created between a transmitter and receiver by a transmitter transmitting a radio frequency toward a receiver. An intrusion event can be detected when the intrusion event passes between the transmitter and receiver and breaks the radio frequency curtain. However, because the radio frequency curtain only exists between the transmitter and receiver, minimal time can be provided for alerting security personal.

In contrast, some embodiments of the present disclosure can provide a system for cooperative intrusion detection that provides an outward looking capability for detection of an intrusion event. For example, as discussed herein, the transmitter 104 can transmit the DSSS signal in a direction away from the receiver 110. By transmitting a DSSS signal in a direction away from the receiver 110, the system 100 can detect more than an intrusion event between the transmitter 104 and receiver 110. For instance, the outward looking capability of the system 100 can detect intrusion event 108, which is not between the transmitter 104 and the receiver 110.

In some embodiments, a replica of the transmitted DSSS signal can be generated. In an example, information can be sent from the receiver 104 to the transmitter 110 for replication of the transmitted DSSS signal. For instance, the receiver can receive the code used for the pseudo-noise code-modulated signal. In an example, the receiver can generate a replica of the transmitted DSSS signal using the code.

In some embodiments, an azimuth of the reflected DSSS signal 106 can be determined. The azimuth of the reflected DSSS signal 106 can be defined as the angle at which the receiver 110 receives the reflected DSSS signal 106. In an example, depending on where the intrusion event 108 is located, the DSSS signal 102 can be reflected off of the intrusion event 108 differently. As a result, the reflected DSSS signal can be received at a different angle, resulting in an azimuth of the reflected DSSS signal that can change.

As shown in FIG. 1B, a phase delay 112 between the replica of the transmitted DSSS signal and the reflection of the DSSS signal can be determined. In an example, the code used to modulate the transmitted DSSS signal, hereinafter referred to as transmitted code 114, can be used to determine the phase delay of the DSSS signal, since a phase of the code can correspond to a phase of the DSSS signal. Alternatively, and/or in addition, a replica of the transmitted code can be used to determine the phase delay of the DSSS signal.

For instance, the transmitted code 114 and/or replica of the transmitted code can be sent to the receiver and a reflection of the code used to modulate the transmitted DSSS signal, hereinafter referred to as reflected code 116, can be received by the receiver from the intrusion event 108. The reflected code 116 can have a phase delay relative to the transmitted code 114. This can be a result of the transmitted code 114, contained in the DSSS signal 102, reflecting off of the intrusion event 108.

The phase delay can be defined as a delay in phase between a first phase 118 of the transmitted code 114 and a second phase 120 of the reflected code 120 corresponding to the first phase 118 of the transmitted code 116. For instance, the second phase 120 corresponding to the first phase 118 can be delayed by a phase delay 112, relative to the first phase 118, as a result of the DSSS signal 102 reflecting off of the intrusion event 108, as illustrated in FIG. 1A.

In an example, the phase delay 112 can be derived by computing an autocorrelation function for the reflected code 120 and a number of shifted versions of the transmitted code 114 until a shift is found for which the transmitted code 114 and the reflected code 116 correlate. Upon correlation of the transmitted code 114 and the reflected code 116, the phase delay 112 between the first phase 118 of the transmitted code 114 and the second phase 120 corresponding to the first phase 120 of the transmitted code 116 can be determined.

In an example, a chipping sequence 122 can be correlated with the transmitted code 114 and the reflected code 116. The chipping sequence 122 can include a number of chips 127 that form the chipping sequence 122. A chip length 124, which can be defined as a time between each of the number of chips 127, can be used to determine a time corresponding to the phase delay 112.

Upon determination of the phase delay 112 and azimuth of the reflected DSSS signal 106, a position of the intrusion event 108 can be determined. For example, a distance to the intrusion event 108 from a point where the DSSS signal is received can be determined, which can be combined with the azimuth of the reflected DSSS signal 106 to determine the position of the intrusion event 108.

In an example, the distance to the intrusion event 108 can be determined through the equation:

$$D = \frac{c * \tau}{2}$$

where D represents the distance to the intrusion event 108, c represents the speed of light, and $\tau$ represents a propagation delay of the transmitted code 114. For instance, the distance to the intrusion event 108 can be determined as a function of the speed of light and the propagation delay.

In an example, $\tau$ can represent a total time for the DSSS signal to transmit from the transmitter 104 to the intrusion event 108 and receive at the receiver 110 from the intrusion event 108. For example, $\tau$ can be represented by the equation:

$$\tau = R_{tx} + R_{rx}$$

where $\tau$ is the propagation delay, $R_{tx}$ is the time for the DSSS signal 102 to transmit from the transmitter 104 to the intrusion event 108 and $R_{rx}$ is the time for the reflected DSSS signal 106 to transmit from the intrusion event 108 and receive at the receiver 110. The propagation delay can be determined through the equation:

$$\tau = \frac{(\Delta \varphi * T)}{360°}$$

where $\tau$ is the propagation delay, $\Delta \varphi$ is the phase delay 112 and T is a period of the transmitted code 126. For instance, the propagation delay of the transmitted DSSS signal can be determined as a function of the phase delay 112 and the period of the transmitted code, which can be equivalent to a period of the transmitted DSSS signal.

Figure 2:
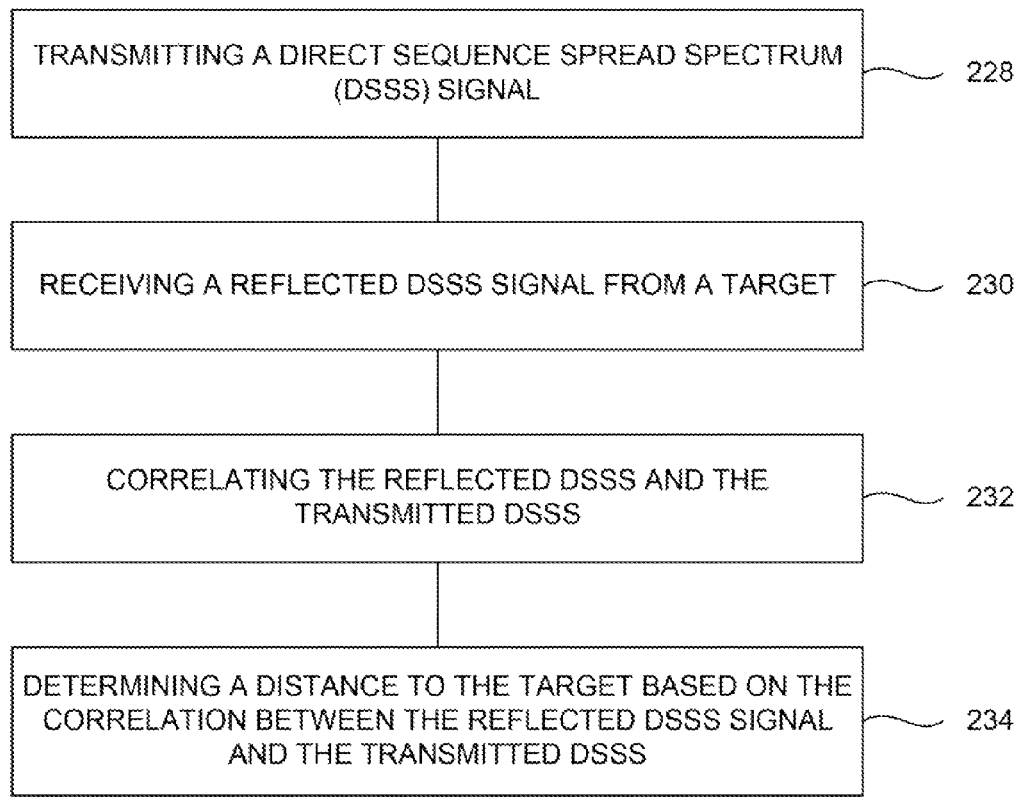
FIG. 2 illustrates a method for cooperative intrusion detection according to one or more embodiments of the present disclosure.

FIG. 2 illustrates a method for cooperative intrusion detection according to one or more embodiments of the present disclosure. At block 228, the method can include transmitting a DSSS signal. As discussed herein, the transmitted DSSS signal can be a pseudo-noise code-modulated signal. The pseudo-noise code-modulated signal can be modulated in frequency according to a code. The method can include receiving a reflected DSSS signal from an intrusion event, at block 230. For instance, the DSSS signal can be reflected off of the intrusion event and received.

In some embodiments, the DSSS signal can be transmitted with a transmitter and the reflected DSSS signal can be received with a receiver. In an example, the transmitter and receiver can be in communication with one another. For instance, information associated with the code used to modulate the transmitted DSSS signal can be sent by the transmitter to the receiver.

In some embodiments, the method can include, at block 232, correlating the reflected DSSS signal and the transmitted DSSS signal. Alternatively, and/or in addition, the code used to modulate the transmitted DSSS signal, which can correspond with the transmitted DSSS signal, can be correlated with a reflection of the code used to modulate the transmitted DSSS signal, which can correspond with the reflected DSSS signal.

In some embodiments, a replica of the code used to modulate the frequency of the transmitted DSSS signal can be generated. In an example, the replica of the code used to modulate the frequency of the transmitted DSSS signal can be generated with the receiver. For instance, the information associated with the code used to modulate the transmitted DSSS signal can be sent by the transmitter to the receiver and used by the receiver to generate the replica of the code used to modulate the frequency of the transmitted DSSS signal.

In an example, a chipping sequence can be correlated between a reflection of the code used to modulate the frequency of the transmitted DSSS signal and the replica of the code used to modulate the frequency of the transmitted DSSS signal. As a result of the transmitted DSSS signal reflecting off of the intrusion event, a phase delay can occur. For instance, a phase delay can occur in the reflection of the reflected DSSS signal and the associated reflection of the code used to modulate the frequency of the transmitted DSSS signal.

As discussed herein, the reflected DSSS signal and the transmitted DSSS signal can be correlated by computing an autocorrelation function for the reflection of the code used to modulate the frequency of the transmitted DSSS signal and a number of shifted versions of the code used to modulate the frequency of the transmitted DSSS signal until a shift is found between the codes. The chipping sequence can then be used to determine a phase delay based on the correlation of the chipping sequence between the reflection of the code used to modulate the frequency of the transmitted DSSS signal and the replica of the code used to modulate the frequency of the transmitted DSSS signal.

The method can include calculating a time delay between the transmitted DSSS signal and the reflected DSSS signal based on the phase delay between the transmitted DSSS signal and the reflected DSSS signal. As discussed herein, the chipping sequence can include a number of chips that form the chipping sequence. A chip length, which can be defined as a time between each of the number of chips can be used to determine a time corresponding to the phase delay. As such, the chip length can be determined for the phase delay, and a time associated with the chip length of the phase delay can be determined.

The method can include, at block 234, determining a distance to the intrusion event based on the correlation between the reflected DSSS signal and the transmitted DSSS signal. In an example, the distance to the intrusion event can be determined based on the phase delay between the reflected DSSS signal and the transmitted DSSS signal. As discussed herein, the phase delay can be determined based on the correlation of the chipping sequence between the reflection of the code used to modulate the frequency of the transmitted DSSS signal and the replica of the code used to modulate the frequency of the transmitted DSSS signal.

In some embodiments, the method can include determining an azimuth of the reflected DSSS signal. As discussed herein, the azimuth of the reflected DSSS signal can be defined as the angle at which the receiver receives the reflected DSSS signal. In an example, a distance to the intrusion event can be determined; however, a position of the intrusion event can remain undetermined if a direction is not associated with the distance to the intrusion event.

In an example, since the reflected DSSS signal is reflected off of the intrusion event and received by the receiver, the position of the intrusion event can be determined to be along a path that the reflected DSSS signal traveled from the intrusion event to the receiver. As such, the azimuth of the reflected DSSS signal can be determined and combined with the distance to the intrusion event to determine the position of the intrusion event.

In some embodiments, a speed of the intrusion event can be determined based on the azimuth of the reflected DSSS signal and the distance to the intrusion event. For example, as discussed herein, the position of the intrusion event can be determined based on the azimuth and the distance to the intrusion event. As such, a first position of the intrusion event at a first time can be determined and a second position of the intrusion event at a second time can be determined.

A distance can be determined between the first position and the second position as well as a difference in time between the first time and the second time. Based on the distance between the first position and the second position and the difference in time between the first time and the second time, the speed of the intrusion event can be determined. Alternatively, and/or in addition, a direction that the intrusion event is traveling can be determined.

Alternatively, and/or in addition, the azimuth can be computed using a beam forming approach where an angular (e.g., directional) spectrum of a signal can be revealed by Fourier transform analysis of the way sound excites different parts of the receiver. Alternatively, and/or in addition, the azimuth can be computed using a high resolution spectral estimation multiple signal classification (MUSIC) algorithm. The MUSIC algorithm can be a kind of directional of arrival (DOA) estimation technique based on eigen value decomposition, in an example.

In some embodiments, the method can include receiving the reflected DSSS signal from the intrusion event at a multi-antenna receiver. In an example, the reflected DSSS signal can be scattered upon reflection off of the intrusion event and/or vegetation and/or debris located between the intrusion event and the receiver. As such, a single antenna can have difficulty determining an angle of arrival of a scattered signal, which can lead to difficulty in determining an azimuth of the intrusion event and/or a phase delay between the transmitted DSSS signal and the reflected DSSS signal, for example.

In an example, receiving the reflected DSSS signal with the multi-antenna receiver can improve an accuracy at which the azimuth of the intrusion event is determined. For example, the reflected DSSS signal received at each of the multiple antennas can be compared. Upon comparison of the reflected DSSS signal received at each of the multiple antennas, reflected DSSS signals with corresponding properties can be grouped.

For instance, reflected DSSS signals with azimuths, wavelengths, and/or amplitudes that are similar can be determined. Based on the comparison of the reflected DSSS signals, a determination of which reflected DSSS signal to use for determining properties associated with the DSSS signal can be made. For instance, DSSS signals received by each of the multiple antennas that share a similar and/or same azimuth, wavelength, and/or amplitude can be used to determine properties associated with the DSSS signal and/or used for determination of phase delay, for example.

In an example, DSSS signals received by each of the multiple antennas that share the similar and/or same azimuth, wavelength, and/or amplitude can be used for the determination of the azimuth. In an example, the reflected DSSS signal can reflect off of vegetation and/or debris, causing DSSS signals of various azimuths to be received by the antenna. As such, a DSSS signal that may be received by one antenna and not another antenna can be neglected.

Alternatively, and/or in addition, a DSSS signal reflected off of the intrusion event can arrive at each of the multiple antennas with the same azimuth. Accordingly, based on the comparison of the reflected DSSS signal received at each of the multiple antennas, a determination of the azimuth of the DSSS signal reflected off of the intrusion event can be made.

In some embodiments, a position of the intrusion event can be determined based on the azimuth of the reflected DSSS signal and the distance to the intrusion event. As discussed herein, the azimuth of the reflected DSSS signal can be determined and combined with the distance to the intrusion event to determine the location of the intrusion event.

In some embodiments, a notification can be sent to an imaging device. In an example, the notification can include the position of the intrusion event. Alternatively, and/or in addition, the notification can include an azimuth, position, and/or size of the intrusion event. Size of the intrusion event can be determined as discussed herein. For instance, the notification can be sent to a video camera, still camera, and/or controller of a video camera and/or still camera. Upon receipt of the notification, the imaging device can be adjusted to focus on the intrusion event and/or record the intrusion event, based on the position of the intrusion event.

In some embodiments, the size of the intrusion event can be sent to the camera, so the camera can zoom in and/or zoom out to acquire an adequately sized image of the intrusion event. For example, if the intrusion event is large, the camera can zoom out and if the intrusion event is small, the camera can zoom in an appropriate amount such that an image with adequate details can be obtained for identification of the intrusion event manually and/or through facial recognition software.

In some embodiments, the method can include determining a size of the intrusion event based on an amplitude signature of the reflected DSSS signal and a radial extent of the intrusion event. As used herein, radial extent of an intrusion event can be defined as a dimension of the intrusion event measured as the transmitted DSSS signal propagates radially outward after reflecting from the intrusion event.

In some embodiments, the method can include determining a type of intrusion event based on the size of the intrusion event and the speed of the intrusion event. For example, if the size of the intrusion event is small and the speed of the intrusion event is slow, the intrusion event can be determined to be a small intrusion event. Alternatively, and/or in addition, if the size of the intrusion event is large and the speed of the intrusion event is fast, the intrusion event can be determined to be a large intrusion event.

In an example, intrusion events can be assigned a priority for identification based on the determination of the type of intrusion event they are. For instance, an intrusion event that is determined to be a small intrusion event (e.g., small in size and slow in speed) can be assigned a low priority for recording with the imaging device and/or identification. Alternatively, and/or in addition, an intrusion event that is determined to be a large intrusion event can be assigned a high priority for recording with the imaging device and/or identification.

Figure 3A:
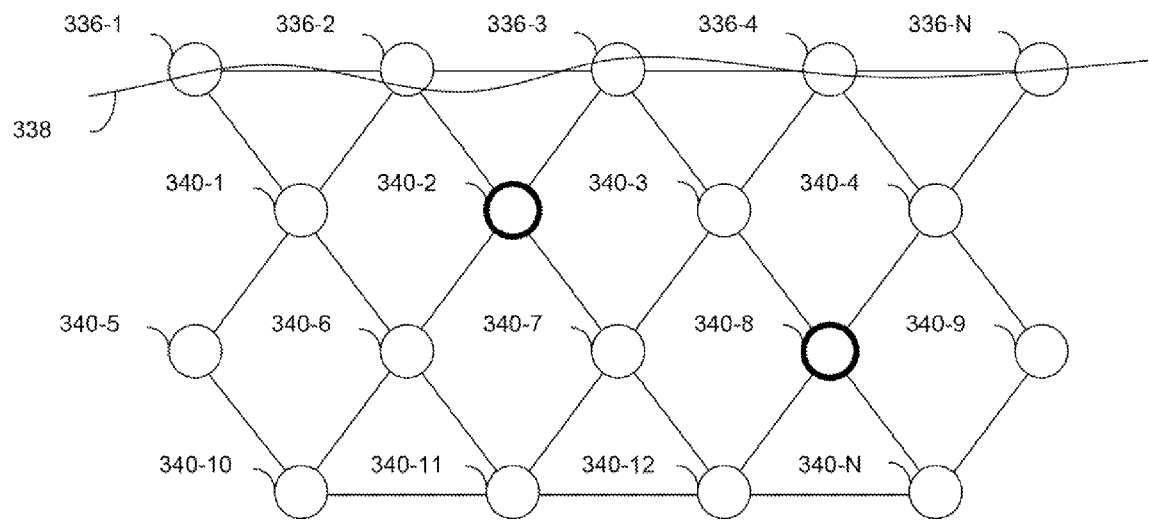
FIG. 3A illustrates a system for cooperative intrusion detection according to one or more embodiments of the present disclosure.

FIG. 3A illustrates a system for cooperative intrusion detection according to one or more embodiments of the present disclosure. In an example, outer perimeter radar nodes 336-1, 336-2, 336-3, 336-4, 336-N, can be placed proximate to a boarder 338 of a monitored area. Outer perimeter radar nodes 336-1, 336-2, 336-3, 336-4, 336-N can be collectively referred to herein as outer perimeter radar nodes 336. In an example, outer perimeter radar nodes 336 can include a transmitter and receiver, as discussed herein, for completing a radar scan with the outer perimeter radar nodes 336 by transmitting a DSSS signal and receiving a reflected DSSS signal from an intrusion event.

In an example, outer perimeter radar node 336-1 can complete a radar scan by transmitting a signal toward outer perimeter radar node 336-2 and receiving a reflected DSSS signal from an intrusion event located in between outer perimeter radar node 336-1 and outer perimeter radar node 336-2. In an example, outer perimeter radar node 336-2 can complete a radar scan by transmitting a signal toward outer perimeter radar node 336-3 and receiving a reflected DSSS signal from an intrusion event located in between outer perimeter radar node 336-2 and outer perimeter radar node 336-3. In an example, outer perimeter radar node 336-3 can complete a radar scan by transmitting a signal toward outer perimeter radar node 336-4 and receiving a reflected DSSS signal from an intrusion event located in between outer perimeter radar node 336-3 and outer perimeter radar node 336-4. In an example, outer perimeter radar node 336-4 can complete a radar scan by transmitting a signal toward outer perimeter radar node 336-N and receiving a reflected DSSS signal from an intrusion event located in between outer perimeter radar node 336-4 and outer perimeter radar node 336-N.

As such, the outer perimeter radar nodes 336 can form a perimeter that follows a boarder 338 of a monitored area. The outer perimeter radar nodes 336 can detect an intrusion event in the monitored area with the radar scan. For example, the outer perimeter radar nodes 336 can detect an intrusion event as it crosses a perimeter created by the outer perimeter created by the outer perimeter radar nodes 336.

Alternatively, and/or in addition, the outer perimeter radar nodes 336 can detect an intrusion event within the monitored area or outside the monitored area. For example, the outer perimeter radar node 336-1 can detect an intrusion event that is not directly between outer perimeter radar node 336-1 and 336-2 based on the azimuth of the reflected DSSS signal, as discussed herein.

In some embodiments, an inner perimeter node 340-1, 340-2, 340-3, in 340-4, 340-5, 340-6, 340-7, 340-8, 340-9, 340-10, 340-11, 340-12, 340-N of the monitored area can be notified of the intrusion event. Inner perimeter radar nodes 340-1, 340-2, 340-3, 340-4, 340-5, 340-6, 340-7, 340-8, 340-9, 340-10, 340-11, 340-12, 340-N can be collectively referred to herein as inner perimeter radar nodes 340.

In an example, the inner perimeter radar nodes 340 can be in communication with the outer perimeter radar nodes 336 via a wired and/or a wireless connection. When the outer perimeter radar nodes 336 are in communication with the inner perimeter radar nodes 340 via a wireless connection, the nodes can communicate with each other using a frequency that is different than a frequency used for the radar scans. By using a frequency for communication that is different than the frequency used for the radar scans, the communication between the nodes can be uninterrupted by the radar scans and the node communications can be uninterrupted by the radar scans.

In an example, the outer perimeter radar nodes 336 and the inner perimeter radar nodes 340 can be battery powered and/or powered via an electrical grid. When the nodes are battery powered, each node can be powered from a respective battery. Alternatively, and/or in addition, multiple nodes can be powered from a single battery.

In an example, inner perimeter radar nodes 340 can be activated from an idle mode in response to the notification of the intrusion event. In an example, the outer perimeter radar nodes 336 can be active nodes and the inner perimeter radar nodes 340 can be idle nodes. For instance, the active nodes and the idle nodes can spend a defined amount of time in a sleep mode to conserve power. As such, a longer time can pass before power sources associated with the nodes (e.g., batteries) have to be replaced.

In an example, a time associated with a sleep mode of the active nodes 340 can be shorter than a time associated with a sleep mode of the idle nodes. For instance, the time associated with the sleep mode of the active nodes 340 can be shorter, which can result in more radar scans per hour by the outer perimeter nodes 336 than the inner perimeter radar nodes 340. This can be important, because the outer perimeter radar nodes 336 are what sense an intrusion event occurring at the outer perimeter. As such, it can be beneficial to perform more radar scans at the outer perimeter with the outer perimeter radar nodes 336 to prevent an intrusion event from occurring when the outer perimeter radar nodes 336 are in sleep mode and not scanning.

In some embodiments, radar scans can be completed with the outer perimeter radar nodes 336 and inner perimeter radar nodes 340 until the intrusion event leaves the monitored area. In an example, the monitored area can be the area between the outer perimeter radar node 336-2 and the inner perimeter radar nodes 340-1, 340-2, and 340-6. In an example, upon activation of the inner perimeter radar node 340 from the idle mode, the inner perimeter radar node 340 can complete radar scans. For instance, a radar scan can be completed by inner perimeter radar node 340-1 in a direction towards inner perimeter radar node 340-6; a radar scan can be completed by inner perimeter radar node 340-6 in a direction towards inner perimeter radar node 340-2; a radar scan can be completed by inner perimeter radar node 340-2 in a direction toward outer perimeter radar node 336-2; and a scan can be completed by outer perimeter radar node 336-2 in a direction toward inner perimeter radar node 340-1.

In some embodiments, the network of outer perimeter radar nodes 336 and inner perimeter radar nodes 340 can be arranged in a pattern than surrounds a monitored area with at least 3 nodes. In an example, the monitored area can be the area between the outer perimeter radar node 336-2 and the inner perimeter radar nodes 340-1 and 340-2. In an example, upon activation of the inner perimeter radar node 340 from the idle mode, the inner perimeter radar node 340 can complete radar scans. For instance, a radar scan can be completed by inner perimeter radar node 340-1 in a direction towards inner perimeter radar node 340-2; a radar scan can be completed by inner perimeter radar node 340-2 in a direction toward outer perimeter radar node 336-2; and a radar scan can be completed by outer perimeter radar node 336-2 in a direction toward inner perimeter radar node 340-1. Alternatively, and/or in addition, the monitored area can be between inner perimeter radar nodes 340, for example, the monitored area can be between inner perimeter radar nodes 340-2, 340-6, 340-7.

In some embodiments, the radar nodes can detect when the intrusion event leaves the monitored area. For instance, when the intrusion event crosses a perimeter of the monitored area formed by 336-2, 340-1, 340-2 into the monitored area formed by 336-2, 340-2, 336-3, the intrusion event can cross a perimeter formed by a radar scan completed by the inner perimeter radar node 340-2 toward the outer perimeter radar node 336-2. As such, the intrusion event can be detected by the radar scan completed by the inner perimeter radar node 340-2. Alternatively, and/or in addition, a speed and/or direction of the intrusion event can be detected, as discussed herein. The speed and/or direction can be used to determine that the intrusion event is leaving the monitored area formed by 336-2, 340-1, 340-2 and entering the monitored area formed by 336-2, 340-2, 336-3.

In an example, upon determination that the intrusion event is leaving the monitored area formed by 336-2, 340-1, 340-2 and entering the monitored area formed by 336-2, 340-2, 336-3, an indication can be received by the inner perimeter radar node 340-2 to complete a radar scan toward outer perimeter radar node 336-3 to create a perimeter around the intrusion event. Alternatively, and/or in addition, an indication can be received by the inner perimeter radar node 340-1 to enter a sleep mode in order to conserve power. In an example, the inner perimeter radar node 340-1 can enter the sleep mode because the intrusion event has left the monitored area formed by the inner perimeter radar node.

In an example, a time at which the outer perimeter radar nodes 336 perform the radar scan can be synchronized. For example, the outer perimeter radar nodes 336 can perform the radar scan at a same time. Alternatively, and/or in addition, each of the outer perimeter radar nodes 336 can perform the radar scan within a defined time of one another. For instance, the outer perimeter radar node 336-1 can complete the radar scan first, upon completion of the radar scan by the outer perimeter radar node 336-1, the outer perimeter radar node 336-2 can complete the radar scan, and upon completion of the radar scan by the outer perimeter node 336-2, the outer perimeter radar node 336-3 can complete the radar scan.

Figure 3B:
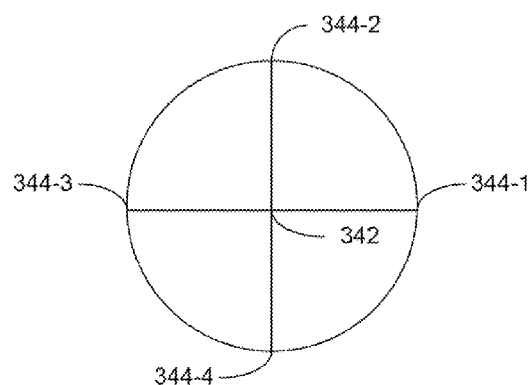
FIG. 3B illustrates an example of a time slotted radar scan, according to one or more embodiments of the present disclosure.

FIG. 3B illustrates an example of a time slotted radar scan, according to one or more embodiments of the present disclosure. In an example, a radar node, can perform a radar scan in one of a number of directions. For instance, the radar node can initiate a radar scan from an origin 342 and the radar scan can be completed in at least one of a first direction 344-1, a second direction 344-2, a third direction 344-3, and a fourth direction 344-4. In an example, the radar scan can first be completed in the first direction 344-1, next the radar scan can be completed in the second direction 344-2, then the radar scan can be completed in the third direction 344-3, and finally the radar scan can be completed in the fourth direction.

In an example, the radar scan can be performed in one of the four directions in a synchronized manner. For instance, the radar scan can be performed in a synchronous manner by each outer perimeter radar node 336 and/or inner perimeter radar node 340 in the first direction 344-1 at a first time, in the second direction 344-2 at a second time, in the third direction 344-3 at a third time, and in the fourth direction 344-4 at a fourth time. In an example, each node, may perform a scan in only one direction after awaking from a sleep mode in a specific time window.

By synchronizing the radar scans, a conflict between the radar nodes can be avoided, in an example. For instance, if the radar nodes were not time synchronized to perform scans in synchronized directions, two radar nodes may direct radar scans toward each other, causing conflict between the radar nodes. In contrast, each radar node can perform a radar scan synchronously in the same direction at the same time.

In an example, four time windows can be allocated for performing scans, which can serve as a scheduling system. If a radar node is scheduled to perform a scan in the second direction 344-2, for example, it can be programmed to sleep for a period, but to wake up at the time window for the second direction 344-2. Once awake, the radar node can check to see if any other scans are need, and return to sleep if no other events are scheduled for that period.

As discussed herein, the period between time windows can be based on a rate of travel associated with an intrusion event and/or power consumption estimates for the radar nodes. For instance, a target can have a defined rate of travel. As such, a particular amount of time can be required for an intrusion event to cross a radar node's field of view. Accordingly, the radar node can be programmed to scan periodically based on the defined rate of travel associated with the intrusion event. Alternatively, and/or in addition, a particular amount of time can be set between radar scans to reduce power consumption for the radar nodes. For example, radar scans can be scheduled often enough to detect a target based on its defined rate of travel but can be spaced apart enough to reduce power consumption.

In an example, the frequency used for the radar scan can be varied depending on varying environmental conditions. For example, depending on where a radar node is placed, varying types of foliage can be present in a path of the radar scan completed by the radar node. Alternatively, and/or in addition, varying weather conditions can present different types of weather patterns (e.g., snow, wind, rain, humidity). As such, it may be beneficial to vary the frequency used for the radar scan to enable the radar scan to better penetrate the varying types of foliage and/or weather patterns.

In an example, to enable the radar scan to better penetrate the varying types of foliage and/or weather patterns, the frequency used for the radar scan can be varied between 900 megahertz, 2.4 gigahertz, and/or 5.8 gigahertz, although examples are not so limited. For instance, a lower frequency (e.g., 900 megahertz) can penetrate differently than a higher frequency (e.g., 5.8 gigahertz). As such, the radar nodes can switch frequencies depending on weather patterns and/or placement of the radar nodes.

In an example, one or more of the outer perimeter radar nodes 336 and/or one or more of the inner perimeter radar nodes 340 can act as a gateway radar node (e.g., inner perimeter radar nodes 340-2 and 340-8) that relay a notification from a neighboring node of the intrusion event to a central control center. For example, as discussed herein, the outer perimeter radar nodes 336 and/or the inner perimeter radar nodes 340 can be in wired and/or wireless communication with each other. As such, the outer perimeter radar nodes 336 and/or the inner perimeter radar nodes can send status updates to the gateway radar node, which can then be sent to the central control center via the gateway radar node. In an example, the status updates can be sent to the central control center via a wired and/or wireless connection.

In an example, the status updates can include a battery life of each respective radar node and/or a service message indicating maintenance should be performed on one of the radar nodes. Alternatively, and/or in addition, the status update can include details associated with an intrusion event, such as for example, a type of object associated with the intrusion event, a speed of the intrusion event, a location of the intrusion event, and/or a direction associated with the intrusion event, relative a radar node.

Figure 4:
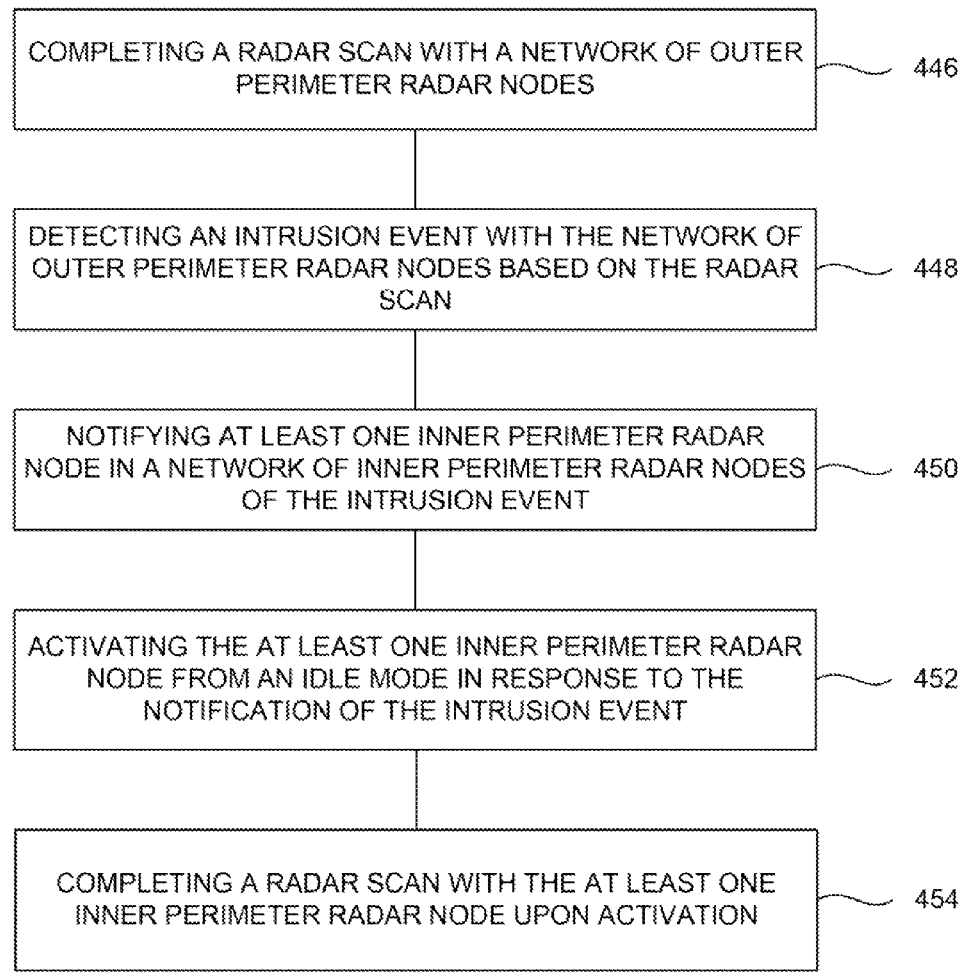
FIG. 4 illustrates a method for cooperative intrusion detection according to one or more embodiments of the present disclosure.

FIG. 4 illustrates a method for cooperative intrusion detection according to one or more embodiments of the present disclosure. The method can include, at block 446, completing a radar scan with a network of outer perimeter radar nodes. In an example, a network can include one or more radar nodes. The network of outer perimeter radar nodes can stretch along a boarder of a monitored area to create a perimeter along the monitored area. As discussed herein, the radar scan can detect an intrusion event occurring at the perimeter and/or proximate to the perimeter. For instance, if the intrusion event is proximate to the perimeter, but has not crossed the perimeter, the intrusion event can be directed based on the azimuth of the DSSS signal reflected from the intrusion event.

The method can include detecting an intrusion event with the network of outer perimeter radar nodes based on the radar scan, at block 448. The radar scan and the detection of the intrusion event can be performed in a manner analogous to that discussed in relation to FIGS. 1 and 2.

In an example, the method can include entering a preliminary clutter rejection state with at least one of the outer perimeter radar nodes upon detection of an intrusion event, wherein the preliminary clutter rejection state filters out a false intrusion event. For instance, the preliminary clutter rejection state can filter out events such as tree movement from wind gusts. In an example, a tree movement can be filtered out by monitoring the movement for a period of time and then determining whether the movement is repetitive. If the movement is repetitive and in the same position, the event can be classified as a false alarm rather than an intrusion event.

In an example, the method can include entering a preliminary classification state with at least one of the outer perimeter radar nodes when the intrusion event is not filtered out by the preliminary clutter rejection state. The preliminary classification state can determine whether the intrusion event is a vehicle based on a speed associated with the intrusion event. As discussed herein, the speed of the intrusion event can be determined from the radar scan. In an example, if the speed of the intrusion event is determined to be within a range of typical vehicular speeds (e.g., 5 to 20 meters per second), the intrusion event can be classified as a vehicle and an alarm can be activated by the at least one of the outer perimeter radar nodes that detected the intrusion event.

The method can include entering a final classification state with at least one of the network of outer perimeter radar nodes when the intrusion event is determined to not be a vehicle. For example, if the speed of the intrusion event is determined to be within a range of typical animal/pedestrian speeds (e.g., 1 to 5 meters per second), the final classification state can determine whether the intrusion event is a human or an animal.

In an example, the outer perimeter radar node can determine whether the intrusion event is a human or an animal based on a size of the intrusion event that has been determined, as discussed herein. For example, if the intrusion event is a fox, the intrusion will have a smaller size than if the intrusion event is a human. In an example, the size of the intrusion event can include a height of the intrusion event and/or a width of the intrusion event. If the intrusion event is classified as a human, an alarm can be activated by the at least one of the outer perimeter radar nodes that detected the intrusion event, for example.

In some embodiments, the method can include, at block 450, notifying at least one inner perimeter radar node in a network of inner perimeter radar nodes of the intrusion event. As discussed herein, the inner perimeter radar nodes can be notified of the intrusion event via a signal sent from the outer perimeter radar nodes and received by the inner perimeter radar nodes through a wired connection or a wireless connection.

In some embodiments, the method can include, at block 452, activating the at least one inner perimeter radar node from an idle mode in response to the notification of the intrusion event. In an example, as discussed herein, the inner perimeter radar nodes can be idle nodes, which can operate in a sleep mode for a defined amount of time to conserve energy. In the sleep mode, the radar node can turn off its radar and/or communications, for example. At periodic intervals, the radar node can awake from sleep mode, enabling the radar node to check for communications from neighboring radar nodes. If the radar node receives a communication from a neighboring radar node that an intrusion event has occurred, the method can include, at block 454, completing a radar scan with the at least one inner perimeter radar node upon activation to determine a position of the intrusion event and/or determine whether the intrusion event has crossed a perimeter between the radar node and another radar node defined by the radar scan. For example, the inner perimeter radar node can complete the radar scan upon activation.

As such, if the intrusion event is determined to be a vehicle and/or human by the outer perimeter radar node, the network of inner perimeter radar nodes can be activated from an idle mode in response to the determination. In an example, if the outer perimeter radar node detects an intrusion event, a notification can be sent to neighboring outer perimeter radar nodes and/or neighboring inner perimeter radar nodes, instead of to an entire network of nodes. This can help radar nodes, which do not neighbor the intrusion event save power by remaining inactive.

In an example, the outer perimeter radar nodes can alternate between a sleep mode and an active mode. For example, the outer perimeter radar nodes can be active nodes, which enter a sleep mode less frequently and/or for a shorter period of time than the inner perimeter radar nodes. By alternating between a sleep mode and an active mode, the outer perimeter radar nodes can conserve energy and thus remain active in the field for a longer period of time without service.

In an example, the method can include performing a radar scan in one of a plurality of directions when the outer perimeter radar node and/or inner perimeter radar node is in the active mode. In an example, the outer perimeter radar node and/or inner perimeter radar node can perform a radar scan in a plurality of directions to detect an intrusion event that is proximate to the radar node. For instance, if a radar node is an intersection point between four monitored areas (e.g., inner perimeter radar node 340-3 in FIG. 3), the radar node can make a scan in one of the four directions upon receiving a notification of an intrusion event.

In an example, when the outer perimeter radar node performs a scan in one of a plurality of directions and does not detect an intrusion event, the outer perimeter radar node can enter the idle mode. As such, the outer perimeter radar node can save energy.

In an example, the network of outer perimeter radar nodes and inner perimeter radar nodes are arranged in a pattern that can surround a monitored area with at least 3 nodes. For example, a radar node can be placed on each vertex of the triangle. In an example where an outer perimeter radar node forms a vertex of the monitored area, an outer and inner perimeter of the monitored area can be defined by scans made by the surrounding outer perimeter radar nodes and the inner perimeter radar nodes. Alternatively, and/or in addition, where all of the vertices of the monitored area include an inner perimeter radar node, the inner perimeter of the monitored area can be defined by scans made by the surrounding inner perimeter radar nodes.

In an example, the method can include performing continual radar scans of the outer and/or inner perimeter of the monitored area until the intrusion event is not present in the monitored area. For example, the intrusion event can enter the monitored area, at which time inner perimeter radar nodes and/or outer perimeter radar nodes can be activated and perform radar scans, forming a perimeter around the monitored area. When the intrusion event crosses the perimeter formed by the radar scans, thus passing into an adjacent monitored area, the radar nodes that do not perform a radar scan of a shared boarder perimeter with the adjacent monitored area can enter a sleep mode to save power. Alternatively, and/or in addition, the radar nodes can operate for a defined amount of time after the intrusion event has left the monitored area and then enter a sleep mode.

In an example, the method can include activating radar nodes forming a perimeter of a neighboring monitored area when the intrusion event moves across a boarder perimeter that is shared by the monitored area and the neighboring monitored area. For instance, as the intrusion event moves into the adjacent monitored area by crossing the shared boarder perimeter of the monitored area and the adjacent monitored area, the radar nodes that form the perimeter of the adjacent monitored area with their radar scans can be activated. The radar nodes that form the perimeter of the adjacent monitored area can then remain active until the intrusion event crosses a perimeter of the adjacent monitored area.

As such, a location of the intrusion event can be isolated to within the monitored area. This can allow for tracking of the intrusion event as the intrusion event moves from one monitored area to the next.

Figure 5:
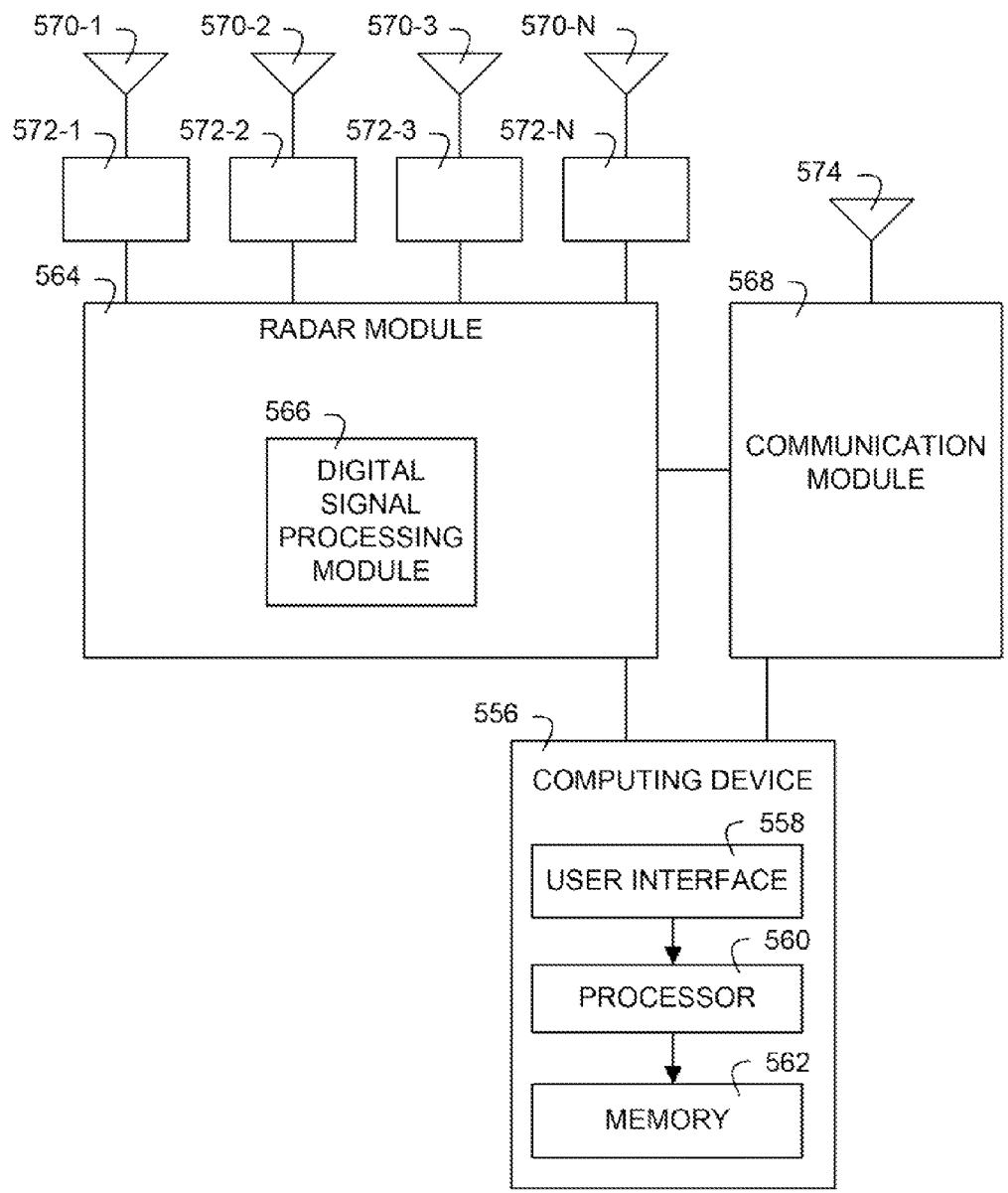
FIG. 5 illustrates a computing device for cooperative intrusion detection according to one or more embodiments of the present disclosure.

FIG. 5 illustrates a computing device for cooperative intrusion detection according to one or more embodiments of the present disclosure. Computing device 556 can be used to perform the method as discussed in relation to FIGS. 2 and 4. As shown in FIG. 5, computing device 556 includes a user interface 558. User interface 558 can be a graphic user interface (GUI) that can provide (e.g., display and/or present) and/or receive information (e.g., data and/or images) to and/or or from a user (e.g., operator) of computing device 556. For example, user interface 558 can include a screen that can provide information to a user of computing device 556 and/or receive information entered into a display on the screen by the user. However, embodiments of the present disclosure are not limited to a particular type of user interface.

As shown in FIG. 5, computing device 556 includes a processor 560 and a memory 562 coupled to the processor 560. Memory 562 can be volatile or nonvolatile memory. Memory 562 can also be removable (e.g., portable) memory, or non-removable (e.g., internal) memory. For example, memory 562 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 562 is illustrated as being located in computing device 556, embodiments of the present disclosure are not so limited. For example, memory 562 can also be located internal to another computing resource (e.g., enabling computer readable instructions to be downloaded over the Internet or another wired or wireless connection). Memory 562 can also store executable instructions, such as, for example, computer readable instructions (e.g., software), for cooperative intrusion detection according to one or more embodiments of the present disclosure.

Processor 560 can execute the executable instructions stored in memory 562 in accordance with one or more embodiments of the present disclosure. For example, processor 560 can execute the executable instructions stored in memory 562 to transmit a first DSSS signal from a first point and a second DSSS signal from a second point. For example, the first DSSS signal can be transmitted from a first transmitter at the first point and the second DSSS signal can be transmitted from a second transmitter at a second point.

In some embodiments, the first DSSS signal and/or the second DSSS signal can be transmitted at a frequency in the industrial, scientific, and medical (ISM) radio bands. The ISM bands can be reserved for the use of radio frequency energy for ISM purposes other than communications. In an example, the first DSSS signal and/or the second DSSS signal can be transmitted at a frequency of at least one of 900 megahertz, 2.4 gigahertz, and/or 5.8 gigahertz.

In some embodiments, processor 560 can execute the executable instructions stored in memory 562 to receive a reflection of the first DSSS signal from an intrusion event at the first point and a reflection of the second DSSS signal from the intrusion event at the second point. In an example, the reflection of the first DSSS signal can be received at the first point with a first receiver and the reflection of the second DSSS signal can be received at the second point with a second receiver.

As shown in FIG. 5, a radar module 564 can include a digital signal processing module 566. As discussed herein, the digital signal processing module 566 can be used for detecting the intrusion event, determining a position of the intrusion event, a speed of the intrusion event, size of the intrusion event, and/or a type of intrusion event. Alternatively, and/or in addition, the digital signal processing module 566 can assign a priority for identification based on a determination of the type of intrusion event, as discussed herein.

As shown in FIG. 5, a communication module 568 can be in communication with an antenna 574. The communication module 568 can transmit instructions to a controller of an imaging device and/or imaging device wirelessly through a communications antenna 574. For example, upon detection of an intrusion event, instructions can be sent to a camera controller to record the intrusion event, as discussed herein. Alternatively, and/or in addition, the communication module 568 can be used for communication between outer perimeter radar nodes, inner perimeter radar nodes, and/or a central control center. For instance, the communication module 568 can be used for communication between outer perimeter radar nodes, inner perimeter radar nodes, and/or a central control center and can communicate via a wired and/or wireless connection. In an example, the communication module 568 can send and/or receive a notification of an intrusion event.

In an example, at least one of the outer perimeter radar node and the inner perimeter radar node can act as a gateway radar node that relay a notification from a neighboring node of the intrusion event to a central control center. As discussed herein, the outer perimeter radar nodes and/or the inner perimeter radar nodes can send status updates to the gateway radar node, which can then be sent to the central control center via the gateway radar node.

The receiver 510 can include multiple antennas 570-1, 570-2, 570-3, 570-N. In an example, the multiple antennas can receive the reflection of the DSSS signal. As discussed herein, the reflected DSSS signal can be reflected off of vegetation and/or debris, which can cause the signal to scatter, which can make it difficult to identify the DSSS signal reflected from the intrusion event. By receiving DSSS signals that have been scattered with multiple antennas, the DSSS signals can be compared and a determination can be made of which DSSS signal was reflected off of the intrusion event. As such, the reflected DSSS signal can be used for determining properties of the intrusion event.

The receiver 510 can include multiple converters 572-1, 572-2, 572-3, 572-N. Upon reception of the reflected DSSS signal at the antennas 570-1, 570-2, 570-3, 570-N, the converters 572-1, 572-2, 572-3, 572-N can convert the reflected DSSS signal to a reflection of a code used to modulate the transmitted DSSS signal, as discussed herein.

In some embodiments, processor 560 can execute the executable instructions stored in memory 562 to determine a first phase delay between the reflection of the first DSSS signal and the first transmitted DSSS signal and a second phase delay between the reflection of the second DSSS signal and the second transmitted DSSS signal. As discussed herein, the reflection of the code used to modulate the transmitted DSSS signal can be used to determine the phase delay.

In some embodiments, processor 560 can execute the executable instructions stored in memory 562 to determine a position of the intrusion event based on the first and second phase delay and a distance between the first and second point. In an example, a distance from the first point to the intrusion event can be determined from the first phase delay, as discussed herein and a distance from the second point to the intrusion event can be determined from the second phase delay.

Accordingly, the position of the intrusion event can be found based on the distance to the intrusion event from the first point, the distance to the intrusion event from the second point, and the distance between the first and second point. In an example, a triangle can be formed by the distance to the intrusion event from the first point, the distance to the intrusion event from the second point, and the distance between the first and second point. As such, an azimuth of the intrusion event can be determined in relation to the first and/or second point, for example.

In some embodiments, processor 560 can execute the executable instructions stored in memory 562 to store the position of the intrusion event at a first time and a second time.

In an example, a speed of the intrusion event can be determined based on the position of the intrusion event at the first time and the position of the intrusion event at the second time, as discussed herein.

In some embodiments, processor 560 can execute the executable instructions stored in memory 562 to display the position of the intrusion event on the user interface 558. In an example, statistics associated with the intrusion event can be displayed on the user interface 558. For instance, the size of the intrusion event, the speed of the intrusion event, and/or classification of the type of intrusion event can be displayed on the user interface 558.

Alternatively, and/or in addition, a map can be displayed on the user interface 558 and the intrusion event can be displayed on the map. For example, the map can include a depiction of an area being monitored by cooperative intrusion detection.

In some embodiments, processor 560 can execute the executable instructions stored in memory 562 to receive, with an inner perimeter radar node, a notification from an outer perimeter radar node that an intrusion event has been detected by the outer perimeter radar node in a monitored area upon completion of a radar scan. In an example, the outer perimeter radar node can be placed along a border of the monitored area and the inner perimeter radar node can be placed within the boarder of the monitored area.

In some embodiments, processor 560 can execute the executable instructions stored in memory 562 to activate the inner perimeter radar node from an idle mode in response to receiving the notification of the intrusion event. In an example, as discussed herein, the inner perimeter radar nodes can be idle nodes, which can operate in a sleep mode for a defined amount of time to conserve energy.

In some embodiments, processor 560 can execute the executable instructions stored in memory 562 to complete radar scans of the perimeter of the monitored area with the inner perimeter radar node and the outer perimeter radar node until the intrusion event is not present in the monitored area. For example, by completing radar scans with the inner perimeter radar node and the outer perimeter radar node, the intrusion event can be surrounded on all sides with radar scans. As such, it can be detected if the intrusion event leaves the monitored area as a result of the intrusion event crossing one of the radar scans.

In some embodiments, processor 560 can execute the executable instructions stored in memory 562 to activate radar nodes forming a perimeter of an adjacent monitored area when the intrusion event moves across a perimeter that is shared by the monitored area and the adjacent monitored area. In an example, the radar nodes within the monitored area that do not form a perimeter of the adjacent monitored area can enter a sleep mode. For instance, when the intrusion event moves from one monitored area to an adjacent monitored area, the radar nodes surrounding the monitored area, that do not perform a radar scan of a shared perimeter between the monitored area and the adjacent monitored area can enter a sleep mode to save energy.

In an example, the outer perimeter radar node can complete a radar scan periodically based on a defined rate of travel associated with the intrusion event. For instance, a human and/or vehicle can have a defined rate of travel (e.g., 1 to 5 meters per second for a human, 5 to 20 meters per second for a vehicle). As such, a particular amount of time can be required for an intrusion event to cross a radar node's field of view. Accordingly, the radar node can be programmed to scan periodically based on the defined rate of travel associated with the intrusion event. For example, the radar node can be programmed to perform radar scans within a time frame that is shorter than the time that it takes for the intrusion event to cross the radar node's field of view. This can allow the radar node to conserve energy, while still performing enough radar scans to detect an intrusion event.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for cooperative perimeter monitoring, comprising:
    completing a radar scan with a network of outer perimeter radar nodes;
    detecting an intrusion event with the network of outer perimeter radar nodes based on the radar scan;
    notifying at least one inner perimeter radar node in a network of inner perimeter radar nodes of the intrusion event, wherein a time associated with a sleep mode of the outer perimeter radar nodes is shorter than a time associated with the inner perimeter radar nodes;
    activating the at least one inner perimeter radar node from an idle mode in response to the notification of the intrusion event; and
    completing a radar scan with the at least one inner perimeter radar node upon activation.

2. The method of claim 1, wherein:
    the inner perimeter radar nodes check for a notification from a neighboring node at periodic intervals.

3. The method of claim 1, wherein the network of outer perimeter radar nodes and inner perimeter radar nodes are arranged in a pattern that surrounds a monitored area with at least 3 nodes.

4. The method of claim 3, wherein an outer and inner perimeter of the monitored area is defined by scans made by the surrounding outer perimeter radar nodes and the inner perimeter radar nodes.

5. The method of claim 3, wherein the method includes performing continual radar scans of the outer and inner perimeter of the monitored area until the intrusion event is not present in the monitored area.

6. The method of claim 3, wherein the method includes:
    activating radar nodes forming a perimeter of an adjacent monitored area when the intrusion event moves across a border perimeter that is shared by the monitored area and the adjacent monitored area; and
    causing nodes within the monitored area that do not form a shared border perimeter of the adjacent monitored area to enter a sleep mode.

7. The method of claim 1, wherein the method includes entering a preliminary clutter rejection state with at least one of the outer perimeter radar nodes upon detection of an intrusion event, wherein the preliminary clutter rejection state filters out a false intrusion event.

8. The method of claim 7, wherein the method includes:
    entering a preliminary classification state with at least one of the outer perimeter radar nodes when the intrusion event is not filtered out by the preliminary clutter rejection state, wherein the preliminary classification state determines whether the intrusion event is a vehicle based on a speed associated with the intrusion event; and
    activating the network of inner perimeter radar nodes from an idle mode in response to a determination that the intrusion event is a vehicle.

9. The method of claim 8, wherein the method includes:
    entering a final classification state with at least one of the network of outer perimeter radar nodes when the intrusion event is determined to not be a vehicle, wherein the final classification state determines whether the intrusion event is a human or an animal;
    activating the network of inner perimeter radar nodes from an idle mode in response to a determination that the intrusion event is a human.

10. The method of claim 1, wherein the method includes:
    alternating between the sleep mode and an active mode with the outer perimeter radar nodes; and
    performing a radar scan in one of a plurality of directions when the outer perimeter radar node is in the active mode.

11. The method of claim 10, wherein the outer perimeter radar node enters the idle mode upon performing the radar scan and not detecting an intrusion event.

12. A machine-readable non-transitory medium storing instructions for cooperative perimeter monitoring, executable by a machine to cause the machine to:
    receive, with an inner perimeter radar node, a notification from an outer perimeter radar node that an intrusion event has been detected by the outer perimeter radar node in a monitored area upon completion of a radar scan, wherein a time associated with a sleep mode of the outer perimeter radar nodes is shorter than a time associated with the inner perimeter radar nodes;
    activate the inner perimeter radar node from an idle mode in response to receiving the notification of the intrusion event;
    complete radar scans of the perimeter of the monitored area with the inner perimeter radar node and the outer perimeter radar node until the intrusion event is not present in the monitored area; and
    activate radar nodes forming a perimeter of an adjacent monitored area when the intrusion event moves across a perimeter that is shared by the monitored area and the adjacent monitored area.

13. The medium of claim 12, further comprising instructions executable to cause radar nodes within the monitored area that do not form a perimeter of the adjacent monitored area to enter the sleep mode.

14. The medium of claim 12, wherein at least one of the outer perimeter radar node and the inner perimeter radar node act as a gateway radar node that relay a notification from a neighboring node of the intrusion event to a central control center.

15. The medium of claim 12, wherein the outer perimeter radar node completes a radar scan periodically based on a defined rate of travel associated with the intrusion event.

16. A system for cooperative perimeter monitoring, the system comprising a processing resource in communication with a non-transitory computer-readable medium, wherein the computer-readable medium contains a set of instructions and wherein the processing resource is designed to execute the set of instructions to:

complete a radar scan along an outer perimeter of a monitored area periodically, with an outer perimeter radar node, based on a defined rate of travel associated with an intrusion event;

detect an intrusion event in the monitored area with the radar scan;

notify an inner perimeter radar node of the monitored area of the intrusion event;

activate the inner perimeter radar node from an idle mode in response to the notification of the intrusion event; and complete radar scans with the outer and inner perimeter radar nodes until the intrusion event leaves the monitored area, wherein the outer perimeter radar nodes are active nodes and the inner perimeter radar nodes are idle nodes, and wherein a time associated with a sleep mode of the active nodes is shorter than a time associated with a sleep mode of the idle nodes.

17. The system of claim 16, wherein the outer and inner perimeter radar nodes communicate with each other using a frequency that is different than a frequency used for the radar scans.

18. The system of claim 16, wherein a time at which the outer perimeter radar nodes perform the radar scan is synchronized.

19. The system of claim 16, wherein the frequency used for the radar scan can be varied depending on varying environmental conditions.

* * * * *